United States Patent
Ahn et al.

(10) Patent No.: US 9,472,830 B2
(45) Date of Patent: Oct. 18, 2016

(54) LITHIUM SECONDARY BATTERY HAVING IMPROVED LIFESPAN CHARACTERISTICS

(71) Applicant: LG Chem, Ltd., Seoul (KR)

(72) Inventors: Kyoung Ho Ahn, Daejeon (KR); Chul Haeng Lee, Daejeon (KR); Jung Hoon Lee, Daejeon (KR); Doo Kyung Yang, Daejeon (KR); Young Min Lim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/560,139

(22) Filed: Dec. 4, 2014

(65) Prior Publication Data

US 2015/0086880 A1 Mar. 26, 2015

Related U.S. Application Data

(63) Continuation of application No. PCT/KR2014/005322, filed on Jun. 18, 2014.

(30) Foreign Application Priority Data

Jun. 18, 2013 (KR) .................. 10-2013-0069909

(51) Int. Cl.
*H01M 10/0567* (2010.01)
*H01M 4/131* (2010.01)
(Continued)

(52) U.S. Cl.
CPC ......... *H01M 10/0567* (2013.01); *H01M 4/131* (2013.01); *H01M 4/485* (2013.01);
(Continued)

(58) Field of Classification Search
CPC . H01M 4/131; H01M 10/0567; H01M 4/485

USPC ......................................................... 429/332
See application file for complete search history.

(56) References Cited

U.S. PATENT DOCUMENTS

2011/0017528 A1  1/2011  Kumar et al.
2011/0027646 A1  2/2011  Lee et al.
(Continued)

FOREIGN PATENT DOCUMENTS

CN  1894822 A   1/2007
CN  102780035 A  11/2012
(Continued)

OTHER PUBLICATIONS

Written Opinion of the International Searching Authority dated Sep. 18, 2014.
(Continued)

*Primary Examiner* — Basia Ridley
*Assistant Examiner* — James Erwin
(74) *Attorney, Agent, or Firm* — Lerner, David, Littenberg, Krumholz & Mentlik, LLP

(57) ABSTRACT

Disclosed is a lithium secondary battery having improved lifespan characteristics. More particularly, a lithium secondary battery comprising a cathode, an anode, a separator interposed between the cathode and anode, and an electrolyte, wherein the anode comprises lithium titanium oxide (LTO) as an anode active material, the electrolyte comprises a lithium salt; a non-aqueous-based solvent; and (a) a phosphate compound which can prevent gas generation during high-temperature storage, (b) a sulfonate compound which can reduce discharge resistance by forming a low-resistance SEI layer, or a mixture of the compound (a) and the compound (b), is disclosed.

17 Claims, 1 Drawing Sheet

(51) Int. Cl.
   *H01M 4/485*      (2010.01)
   *H01M 10/052*     (2010.01)
   *H01M 10/0568*    (2010.01)
   *H01M 10/0569*    (2010.01)
   *H01M 10/0525*    (2010.01)

(52) U.S. Cl.
   CPC ....... *H01M10/052* (2013.01); *H01M 10/0525* (2013.01); *H01M 10/0568* (2013.01); *H01M 10/0569* (2013.01); *H01M 2220/20* (2013.01); *Y02E 60/122* (2013.01); *Y02T 10/7011* (2013.01)

(56) References Cited

U.S. PATENT DOCUMENTS

| | | |
|---|---|---|
| 2011/0064973 A1 | 3/2011 | Song |
| 2012/0034532 A1 | 2/2012 | Kim et al. |
| 2012/0202125 A1 | 8/2012 | Han |
| 2012/0308881 A1* | 12/2012 | Tokuda ............. H01M 10/0567 429/199 |
| 2013/0022880 A1 | 1/2013 | Tsujioka et al. |
| 2013/0130128 A1 | 5/2013 | Okamoto et al. |
| 2014/0087249 A1* | 3/2014 | Azami ................ H01M 4/133 429/188 |
| 2014/0176074 A1 | 6/2014 | Kako et al. |

FOREIGN PATENT DOCUMENTS

| | | |
|---|---|---|
| JP | 2003238156 A | 8/2003 |
| JP | 2005203341 A | 7/2005 |
| JP | 2012253010 A | 12/2012 |
| KR | 20100056672 A | 5/2010 |
| KR | 20100075913 A | 7/2010 |
| KR | 10-1042613 B1 | 6/2011 |
| KR | 2012-0068826 A | 6/2012 |
| KR | 2012-0091627 A | 8/2012 |
| KR | 10-1211863 B1 | 12/2012 |
| WO | 2009-036444 A2 | 3/2009 |
| WO | 2012017999 A1 | 2/2012 |
| WO | 2012-145796 A1 | 11/2012 |

OTHER PUBLICATIONS

International Search Report from PCT/KR2014/005322, dated Sep. 18, 2014.

* cited by examiner

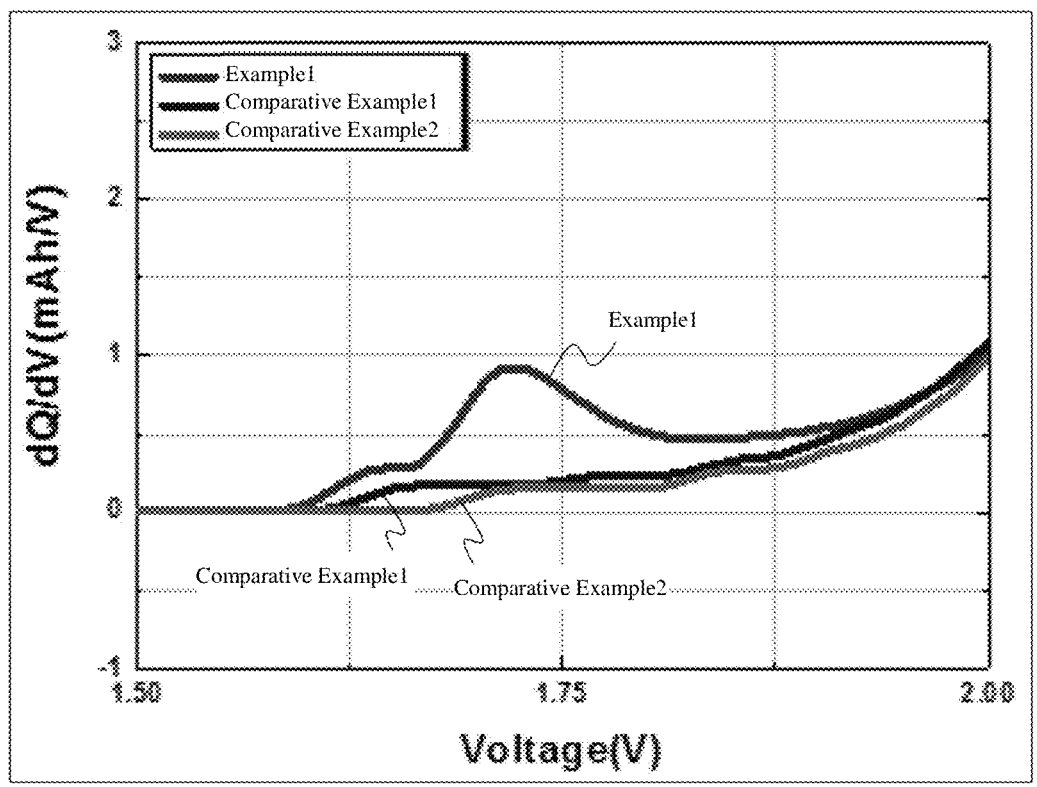

LITHIUM SECONDARY BATTERY HAVING IMPROVED LIFESPAN CHARACTERISTICS

CROSS REFERENCE TO RELATED APPLICATIONS

The present application is a continuation of International Application No. PCT/KR2014/005322 filed Jun. 18, 2014, which claims the benefit of the filing date of Korean Patent Application No. 10-2013-0069909 filed June 18, 2013, the disclosures of which are hereby incorporated herein by reference.

TECHNICAL FIELD

The present invention relates to a lithium secondary battery having improved lifespan characteristics.

BACKGROUND ART

As mobile device technology continues to develop and demand therefor continues to increase, demand for secondary batteries as energy sources is rapidly increasing. Among these secondary batteries, lithium secondary batteries, which have high energy density and operating voltage, long cycle lifespan, and low self-discharge rate, are commercially available and widely used.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively underway. As a power source of EVs, HEVs, and the like, a nickel metal-hydride secondary battery is mainly used. However, research into lithium secondary batteries having high energy density, high discharge voltage and output stability is actively underway and some lithium secondary batteries are commercially available.

A cathode, anode, separator and electrolyte of lithium secondary batteries include a variety of additives as power generation elements. Among such additives, an electrolyte additive for lifespan improvement has lifespan extension effect by forming a solid electrolyte interface (SEI) film over a surface of an electrode during an initial battery formation process or to recover an SEI layer partially damaged by a repeated charge/discharge.

The properties of the SEI layer depends on a type of a solvent, properties of additives, and the like included in an electrolyte. In addition, the SEI layer property affects transfer of ions and electric charge, and thereby battery performance may be changed (See. Shoichiro Mori, Chemical properties of various organic electrolytes for lithium rechargeable batteries, J. Power Source (1997) Vol. 68).

When a carbon-based material is used as an anode active material, oxidation/reduction potential is 0.1 V lower than the potential of $Li/Li^+$. Accordingly, a non-aqueous electrolyte is decomposed on an anode surface and thereby the decomposed non-aqueous electrolyte reacts with lithium. The additive also easily reacts and thereby an SEI layer is formed.

The formed SEI layer functions as an ion tunnel and thereby merely lithium ions pass therethrough. Due to such ion tunnel effect, solvation of lithium ions is performed and thereby, among electrolytes, organic solvents, which have a large molecular weight, such as a lithium salt, EC, DMC, DEC, or the like, transferring with lithium ions are inserted into an anode, and, accordingly, disruption of an anode structure may be prevented. In addition, when the SEI layer is formed, lithium ions no longer side react with an anode active material or other materials and quantity of electric charge consumed for formation of the SEI layer as irreversible quantity does not reversibly react when discharged. Therefore, an electrolyte is no longer decomposed and the amount of lithium ions in an electrolyte is reversibly maintained, and, as such, stable charge/discharge may be maintained (J. Power Sources (1994) 51:79to104). As a result, when the SEI layer is formed, the amount of lithium ions is reversibly maintained and, as such, battery lifespan characteristics are also improved.

Accordingly, a variety of electrolyte additives has been introduced to minimize degradation of carbon-based anodes by forming and recovering the SEI layer.

Meanwhile, demand for a battery which may be charged at a high-speed are increasing and thereby interest in use lithium titanium oxide (LTO) as an anode active material is increasing. LTO has advantages such as structural stability and relatively satisfactory cycle characteristics. However, anode materials using LTO as a main active material generate gas such as $H_2$ by catalysis and, as such, lifespan degradation is exhibited.

To address the above problems, attempts have been made to form the SEI layer over a surface of an LTO electrode. However, an anode of lithium secondary batteries including LTO as an anode active material has oxidation/reduction potential that is relatively approximately 1.5 V higher than the potential of $Li/Li^+$ and thereby it is difficult to form the SEI layer with the additive in an SEI layer formation process. Accordingly, battery lifespan performance deterioration problem due to $H_2$ gas generated by continuous catalysis still exists.

Therefore, there is an urgent need for technology which may prevent gas generation by catalysis in a battery using LTO as an anode active material and thereby may improve lifespan characteristics of a battery.

DISCLOSURE

Technical Problem

The present invention has been made to address the aforementioned problems of the related art and to achieve technical goals that have long been sought.

As a result of a variety of intensive studies and various experiments, the inventors of the present invention confirmed that, when a lithium secondary battery electrolyte including LTO as an anode active material includes a specific compound, electrochemical reaction to form an SEI layer is progressed at high operating potential and thereby desired effects may be accomplished, thus completing the present invention.

Technical Solution

In accordance with one aspect of the present invention, provided is a lithium secondary battery including a cathode, an anode, a separator interposed between the cathode and anode, and an electrolyte, wherein the anode includes lithium titanium oxide (LTO) as an anode active material, and the electrolyte includes a lithium salt; a non-aqueous-based solvent; and (a) a phosphate compound which can prevent gas generation during high-temperature storage, (b) a sulfonate compound which can reduce discharge resistance by forming a low-resistance SEI layer, or a mixture of the compound (a) and the compound (b).

Oxidation/reduction potential of a lithium secondary battery anode using a conventional carbon-based material as an anode is 0.1 V lower, when compared to Li/Li+. Accordingly, through reaction of an electrolyte and an anode or reaction of an additive in an electrolyte at an initial formation process, an SEI layer is formed and maintained. On the other hand, as the present invention, a lithium secondary battery including LTO as an anode active material is structurally stable and thereby an electrolyte is rarely decomposed, and oxidation/reduction potential of the anode is approximately 1.2 V to 1.5 V higher than potential of Li/Li+ and thereby it is difficult to form an SEI layer with a conventionally used additive. Accordingly, gas is generated due to catalysis at high temperature and, as such, lifespan characteristics may be deteriorated.

Accordingly, the inventors of the present application developed a material which may electrochemically react at operating potential, particularly 1.2 V to 1.8 V, more particularly 1.3 V to 1.5 V, of a lithium secondary battery including LTO as an anode active material, as a result of intensive study.

As a specific embodiment of the material, the phosphate compound (a), the sulfonate compound (b), or the mixture of the compound (a) and the compound (b) may be reduced at operating potential of the secondary battery and thereby may partially or entirely form a passivation layer containing chemical reaction products of the materials over a surface of an anode. Here, the passivation layer may be a solid electrolyte interface (SEI) film.

The SEI layer is formed by surface reaction through an initial battery formation process, or an aging process at room temperature or at high temperature. The secondary battery according to the present invention in which the SEI layer is formed as described above may prevent gas generation during high-temperature storage and, as such, battery stability and performance improvement may be provided. In particular, superior synergistic effects are exhibited when the phosphate compound (a) and the sulfonate compound (b) are mixed together, than when the phosphate compound (a) and the sulfonate compound (b) are mixed separately.

In particular, the phosphate compound stabilizes $Ti^{4+}$ generated when charging LTO and thereby may prevent acceleration of electrolyte decomposition reaction. The sulfonate compound exists on an electrode surface by reduction reaction and thereby provides a site at which Li may be coordinated, and, accordingly, battery resistance may be reduced. Therefore, when the two compounds are mixed together, gas generation may be suppressed by suppressing electrolyte decomposition reaction. In addition, in LTO of high potential, a low resistance SEI layer may be formed over an anode through reduction reaction and thereby battery performance may be improved, and cathode surface characteristics may be stabilized through the reduction reaction.

As a specific embodiment, the phosphate compound (a) may be represented by Formula 1 below.

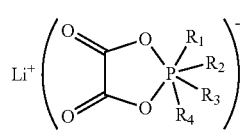

(1)

wherein $R_1$, $R_2$, $R_3$ and $R_4$ each independently may be a halogen, a $C_1$ to $C_{10}$ alkyl group substituted or unsubstituted with a halogen, a C2 to $C_{10}$ alkenyl group substituted or unsubstituted with a halogen, or a $C_1$ to $C_{10}$ alkoxy group substituted or unsubstituted with a halogen, or at least two of $R_1$, $R_2$, $R_3$ and $R_4$ are connected to each other to form an oxalate group.

The halogen may be F or Cl, more particularly F.

In particular, the phosphate compound may be at least one selected from the group consisting of lithium difluorobis(oxalato)phosphate, lithium tetrafluoro(oxalato)phosphate, and lithium tris(oxalato)phosphate, and, in particular, may be lithium difluorobisoxalato phosphate or lithium tetrafluoro phosphate.

As a specific embodiment, the sulfonate compound (b) may be a cyclic hetero compound represented by Formula 2 below.

(2)

When the compound (a) or compound (b) is included alone in an electrolyte, and a mixture of the compound (a) and the compound (b) is included in an electrolyte, the amounts of the included compound and mixture may be 0.1 wt % to 10 wt %, more particularly 0.1 wt % to 5 wt %, based on a total weight of an electrolyte.

When the compound or mixture is included in an amount of less than 0.1 wt %, it is difficult to form a desired SEI layer. On the other hand, when the compound or mixture is included in an amount of greater than 10 wt %, battery performance may be deteriorated due to materials remaining without reaction.

In addition, when the phosphate compound (a) and the sulfonate compound (b) are mixed, the compound (a) and the compound (b) may be included in a weight ratio of 1:1 to 1:5. When the phosphate compound (a) and the sulfonate compound (b) are mixed in the range, an SEI layer having properties to maximize battery performance may be formed.

The electrolyte also further includes at least one compound selected from the group consisting of a lactam-based compound in which an electron withdrawing group is substituted, a silazane-based compound, a silyl amide-based compound, a sultone-based compound, a siloxane-based compound including at least one unsaturated group, and a vinylidene carbonate-based compound.

Generally, the lactam-based compound has low oxidation/reduction potential. Such a property may be caused by great electron density of nitrogen atoms in a ring of the compound. Therefore, when density of nitrogen atoms is reduced by substituting nitrogen positions of a lactam-based compound with an electron withdrawing group (EWG), receiving electrons from the outside becomes easier but giving electrons to the outside becomes more difficult. Accordingly, oxidation/reduction potential of the compound may be increased and an SEI layer may be more easily formed.

The siloxane-based compound may be a material including at least one of —Si—O—Si— bond and carbon-carbon double bond, and may be a material including a —Si—O—Si— bond and at least one carbon-carbon double bond by reacting with impurities such as water and the like in an electrolyte. In the material, the number of the carbon-carbon double bonds is preferably two or more, more particularly two or three. In this case, the material includes a functional group having a carbon-carbon double bond and siloxane and the like which may conduct lithium ions, and thereby SEI layer formation may be more easily performed through a cross-linked bond.

The other materials also exhibit effects in formation and recover of substantial and dense SEI layer, thermal stability of a battery and the like, and thereby a battery operation state may be optimized.

As another ingredient of the electrolyte according to the present invention, the lithium salt, for example, may be selected from the group consisting of LiCl, LiBr, LiI, LiClO$_4$, LiBF$_4$, LIB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, chloroborane lithium, lower aliphatic carboxylic acid lithium, lithium tetraphenyl borate, imides, and mixtures thereof.

As a specific embodiment, the a non-aqueous-based solvent may be selected from the group consisting of a carbonate-based solvent, an ester-based solvent, an ether-based solvent, a ketone-based solvent, an alcohol-based solvent, an aprotic solvent, and a mixture thereof.

As the carbonate-based solvent, linear carbonates such as dimethyl carbonate (DMC), diethyl carbonate (DEC), dipropyl carbonate (DPC), methylpropyl carbonate (MPC), ethylpropyl carbonate (EPC), ethylmethyl carbonate (EMC) and the like; and cyclic carbonates such as ethylene carbonate (EC), propylene carbonate (PC), butylene carbonate (BC), vinylene carbonate and the like may be used. As the ether-based solvent, dibutyl ether, tetraglyme, diglyme, dimethoxyethane, 2-methyltetrahydrofuran, tetrahydrofuran and the like may be used. As the ketone-based solvent, cyclohexanone and the like may be used. In addition, as the alcohol-based solvent, ethyl alcohol, isopropyl alcohol and the like may be used. As the aprotic solvent, nitriles (for example, acetonitrile and the like) such as R—CN (where R is a linear, branched or cyclic hydrocarbon group of C$_2$-C$_{20}$ and may include a double bond, an aromatic ring and an ether bond) and the like, amides such as dimethylformamide and the like, dioxolane such as 1,3-dioxolan and the like, sulfolanes, sulfites such as ethylene sulfite, propylene sulfite and the like, alkoxyethanes such as dimethoxyethane, diethoxyethane and the like, sulfoxides such as dimethylsulfoxide and the like may be used.

The non-aqueous-based solvent may be used alone or by mixing at least one solvent. When at least one solvent is mixed, a mixing ratio may be properly controlled according to desired battery performance, which may be broadly understood by skilled persons of the art. When the carbonate-based solvent is used, a mixture of linear carbonate and cyclic carbonate are preferable. When the linear carbonate and the cyclic carbonate is mixed in a volumetric ratio of approximately 1:1 to approximately 9:1, excellent electrolyte performance may be exhibited.

In some cases, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrroles, 2-methoxy ethanol, aluminum trichloride or the like may be added to the electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, fluoro-ethylene carbonate (FEC), propene sultone (PS), or the like.

Hereinafter, other constitutions of the secondary battery will be described in detail.

The anode is prepared by drying and pressing after coating a mixture of an anode active material, a conductive material and a binder on an anode collector mixture. As desired, the mixture may further include a filler.

As described above, the anode active material may include the LTO and the LTO may be represented by Formula 3 below.

$$Li_xTi_yO_4 \qquad (3)$$

wherein $0.5 \leq x \leq 3$ and $1 \leq y \leq 2.5$.

In particular, the LTO may be Li$_{0.8}$Ti$_{2.2}$O$_4$, Li$_{2.67}$Ti$_{1.33}$O$_4$, LiTi$_2$O$_4$, Li$_{1.33}$Ti$_{1.67}$O$_4$, Li$_{1.14}$Ti$_{1.71}$O$_4$, or the like, but the present invention is not limited thereto. More particularly, the LTO may be Li$_{1.33}$Ti$_{1.67}$O$_4$ having a spinel structure, crystal structure change of which is low during charge/discharge and which has superior reversibility.

The anode active material includes other active materials, in addition to lithium titanium oxide (LTO). For example, the anode active material may include carbon such as hard carbon and graphite-based carbon; metal composite oxides such as Li$_x$Fe$_2$O$_3$ where $0 \leq x \leq 1$, Li$_x$WO$_2$ where $0 \leq x \leq 1$, Sn$_x$Me$_{1-x}$Me'$_y$O$_z$ where Me: Mn, Fe, Pb, or Ge; Me': Al, B, P, Si, Group I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, SnO$_2$, PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, and Bi$_2$O$_5$; conductive polymers such as polyacetylene; Li—Co—Ni-based materials; and titanium oxides. In this case, the amount of LTO may be, for example, 40 to 100% based on the total weight of the anode active material.

The anode current collector is generally fabricated to a thickness of 3 to 500 µm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, silver, or the like, or aluminum-cadmium alloys. Similar to the cathode current collector, the anode current collector may also have fine irregularities at a surface thereof to increase adhesion between the anode active material and the anode current collector. In addition, the anode current collector may be used in any of various forms including films, sheets, foils, nets, porous structures, foams, and non-woven fabrics.

The conductive material is typically added in an amount of 1 wt % to 30 wt % based on a total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be typically added in an amount of 1 wt % to 30 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit anode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

The cathode is manufactured by coating, drying and pressing a cathode active material on a cathode current collector. As desired, the conductive material, binder and filler, which are described above, may be further included.

As the cathode active material, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_2O_4$ where $0 \leq x \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; $LiMn_2O_4$ where some of the Li atoms are substituted with alkaline earth metal ions; disulfide compounds; and $Fe_2(MoO_4)_3$ may be used, but embodiments of the present invention are not limited thereto.

The cathode current collector is generally fabricated to a thickness of 3 to 500 μm. The cathode current collector is not particularly limited so long as it does not cause chemical changes in the fabricated battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The separator is disposed between the cathode and the anode and an insulating thin film having high ion permeability and mechanical strength is used as the separator. The separator typically has a pore diameter of 0.01 μm to 10 μm and a thickness of 5 μm to 300 μm. As the separator, sheets or non-woven fabrics made of an olefin polymer such as polypropylene, glass fibers or polyethylene, which have chemical resistance and hydrophobicity, are used. When a solid electrolyte such as a polymer is used as the electrolyte, the solid electrolyte may also serve as a separator.

The lithium secondary battery according to the present invention may be prepared in accordance with a conventional method publicly known in the art, namely, a method characterized in that a porous separator is inserted between a cathode and an anode, and then an electrolyte is added thereto.

The present invention also provides a battery module including the lithium secondary battery as a unit battery and a battery pack including the battery module. In addition, the present invention also provides a device including the battery pack Examples of the devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a graph illustrating operating potential occurring electrochemical reaction according to Experimental Example 1.

MODE FOR INVENTION

Now, the present invention will be described in more detail with reference to the following examples. These examples are provided only for illustration of the present invention and should not be construed as limiting the scope and spirit of the present invention.

EXAMPLE 1

$Li_{1.33}Ti_{1.67}O_4$ as an active material, Denka black as a conductive material and PVdF as a binder were mixed in a weight ratio of 95:2.5:2.5 in NMP to prepare an anode mixture. Subsequently, the prepared anode mixture was coated to a thickness of 20 μm on copper foil and the coated copper foil was rolled and dried, thereby completing manufacture of an anode.

In addition, $LiNi_{0.78}Mn_{0.11}Co_{0.11}O_2$ as a cathode active material, Denka black as a conductive material, and PVdF as a binder were added to NMP in a weight ratio of 95:2.5:2.5 and the components were mixed to prepare a cathode composite material. Thereafter, the cathode composite material was coated on aluminum foil having a thickness of 20 μm and the coated aluminum foil was rolled and dried, thereby completing manufacture of a cathode.

A porous separator made of polypropylene was interposed between the anode and the cathode to manufacture an electrode assembly. The electrode assembly was inserted into a pouch type case and an electrode lead was connected thereto, and then 1 M $LiPF_6$, EC:EMC in a ratio of 1:1 in vol %, and 1 wt % of lithium difluorobisoxalatophosphate as an electrolyte were injected thereinto. Subsequently, the case was sealed, thereby completing assembly of a lithium secondary battery.

EXAMPLE 2

A lithium secondary battery was assembled in the same manner as in Example 1, except that an electrolyte including 1 wt % of lithium tetrafluorooxalatophosphate was used instead of lithium difluorobisoxalatophosphate of Example 1.

EXAMPLE 3

A lithium secondary battery was assembled in the same manner as in Example 1, except that an electrolyte including 1 wt % of the sulfonate compound of Formula 2 was used instead of lithium difluorobisoxalatophosphate of Example 1.

EXAMPLE 4

A lithium secondary battery was assembled in the same manner as in Example 1, except that the amount of lithium difluorobisoxalatophosphate of Example 1 was reduced to 0.5 wt % and an electrolyte including 0.5 wt % of the sulfonate compound of Formula 2 was used.

EXAMPLE 5

A lithium secondary battery was assembled in the same manner as in Example 4, except that the amount of the sulfonate compound of Formula 2 was reduced to 0.3 wt % and an electrolyte additionally including 0.5 wt % of 1,3-propane sultone was used.

COMPARATIVE EXAMPLE 1

A lithium secondary battery was assembled in the same manner as in Example 1, except that lithium difluorobisoxalatophosphate was not added to an electrolyte.

COMPARATIVE EXAMPLE 2

A lithium secondary battery was assembled in the same manner as in Example 1, except that an electrolyte including 1 wt % of hexamethyldisilazane (HMDS) was used instead of lithium difluorobisoxalatophosphate.

COMPARATIVE EXAMPLE 3

A lithium secondary battery was assembled in the same manner as in Example 1, except that an electrolyte including 0.5 wt % of 1,3-propane sultone was used instead of lithium difluorobisoxalatophosphate.

EXPERIMENTAL EXAMPLE 1

To confirm that electrochemical reaction of the materials in the electrolyte of the battery manufactured according to each of Example 1, and Comparative Examples 1 and 2 is progressed at battery driving potential, voltage was elevated from 1.5 V to 2.0 V and the amount of reduction reaction according to voltage elevation was measured. Results are summarized in FIG. 1.

Referring to FIG. 1, electrochemical reaction of the battery manufactured according to Example 1 progressed while exhibiting peak reduction reaction at 1.69 V. On the other hand, electrochemical reactions of the batteries manufactured according to Comparative Examples 1 and 2 were not progressed at all.

In addition, by comparing Examples 1 to 5, it can be confirmed that, when the phosphate-based compound and the sulfonate-based compound are used together, electrochemical reaction occurs dramatically well, when compared to a case that only one compound is used. When the two type compounds exist together, a phosphate additive suppresses gas generation and a low resistance SEI layer is formed in an anode through a sulfonate additive. Accordingly, when the phosphate-based compound and the sulfonate-based compound are used together, excellent electrochemical reaction is observed.

EXPERIMENTAL EXAMPLE 2

Room-temperature discharge resistance of the battery manufactured according to each of Examples 1 to 5 and Comparative Examples 1 to 3 was measured. Results are summarized in Table 1 below.

EXPERIMENTAL EXAMPLE 3

The battery manufactured according to each of Examples 1 to 5 and Comparative Examples 1 to 3 was stored for two weeks at 60 and 100% SOC, and then the thickness of the battery was measured and an increasing ratio was calculated. Results are summarized in Table 1 below.

TABLE 1

|  | Room-temperature discharge resistance (mohm) | Thickness increasing ratio after storing for two weeks at 60 (%) |
|---|---|---|
| Example1 | 50 | 110 |
| Example2 | 52 | 115 |
| Example3 | 43 | 123 |
| Example4 | 45 | 111 |
| Example5 | 46 | 112 |
| Comparative Example 1 | 56 | 160 |
| Comparative Example 2 | 58 | 170 |
| Comparative Example 3 | 55 | 155 |

Referring to Table 1, the batteries manufactured according to Examples 1 to 5 exhibit relatively low discharge resistance and low thickness increase ratio, when compared to the batteries manufactured according to Comparative Examples 1 to 3. Unlike Examples 1 to 5, electrochemical reaction does not occur in the electrolyte of Comparative Examples 1 to 3 and thereby an SEI layer is not formed. Accordingly, a large amount of gas is released due to catalysis and thereby an internal pressure is elevated, and, accordingly, lifespan degradation may occur.

In addition, by comparing Examples 1 to 5, it can be confirmed that, when the phosphate-based compound and the sulfonate-based compound are used together, low discharge resistance is exhibited and a thickness increase ratio is relatively low, when compared to a case that only one compound is used. When the two type compounds are used, a phosphate additive suppresses generation of gas and a low-resistance SEI layer may be formed through a sulfonate additive. Accordingly, when the phosphate-based compound and the sulfonate-based compound are used together, relatively low discharge resistance and a low thickness increase ratio may be exhibited.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a lithium secondary battery according to the present invention uses a phosphate compound, a sulfonate compound, or a mixture thereof, as ingredients of an electrolyte, and thereby a film may be effectively formed on an electrode of a lithium secondary battery including LTO having high operating potential as an anode active material, and, accordingly, gas generation due to catalysis may be prevented, resulting in improvement of battery lifespan characteristics.

The invention claimed is:

1. A lithium secondary battery comprising a cathode, an anode, a separator interposed between the cathode and anode, and an electrolyte,
   wherein the anode comprises lithium titanium oxide (LTO) as an anode active material, and
   the electrolyte comprises a lithium salt; a non-aqueous-based solvent; and a mixture of (a) a phosphate compound which can prevent gas generation during high-temperature storage, and (b) a sulfonate compound which can reduce discharge resistance by forming a low-resistance SEI layer,
   wherein the mixture of the compound (a) and the compound (b) comprises the compound (a) and the compound (b) in a weight ratio of 1:1 to 1:5,
   wherein the sulfonate compound is a cyclic hetero compound represented by Formula 2 below:

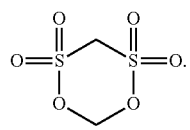

(2)

2. The lithium secondary battery according to claim 1, wherein operating potential of the secondary battery is 1.2 to 1.8 V.

3. The lithium secondary battery according to claim 1, wherein the mixture of the compound (a) and the compound (b) partially or entirely forms a passivation layer comprising a chemical reaction product of the compound(s) by being reduced at a battery operating potential over an anode surface.

4. The lithium secondary battery according to claim 3, wherein the passivation layer is a solid electrolyte interface (SEI) film.

5. The lithium secondary battery according to claim 1, wherein the mixture of the compound (a) and the compound (b) is comprised in an amount of 0.1 wt % to 10 wt % based on a total weight of an electrolyte.

6. The lithium secondary battery according to claim 1, wherein the mixture of the compound (a) and the compound (b) is comprised in an amount of 0.1 wt % to 5 wt % based on a total weight of an electrolyte.

7. The lithium secondary battery according to claim 1, wherein the phosphate compound is represented by Formula 1 below:

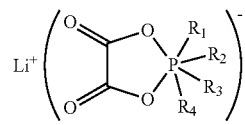

(1)

wherein $R_1$, $R_2$, $R_3$ and $R_4$ each independently are a halogen, a $C_1$ to $C_{10}$ alkyl group substituted or unsubstituted with a halogen, a $C_2$ to $C_{10}$ alkenyl group substituted or unsubstituted with a halogen or a $C_1$ to $C_{10}$ alkoxy group substituted or unsubstituted with a halogen, or at least two of $R_1$, $R_2$, $R_3$ and $R_4$ are connected to each other to form an oxalate group.

8. The lithium secondary battery according to claim 7, wherein the phosphate compound is at least one selected from the group consisting of lithium difluorobis(oxalato)phosphate, lithium tetrafluoro(oxalato)phosphate, and lithium tris(oxalato)phosphate.

9. The lithium secondary battery according to claim 1, wherein the electrolyte further comprises at least one compound selected form the group consisting of a lactam-based compound in which an electron withdrawing group is substituted, a silazane-based compound, a silyl amide-based compound, a sultone-based compound, a siloxane-based compound comprising at least one unsaturated group, and a vinylidene carbonate-based compound.

10. The lithium secondary battery according to claim 1, wherein the lithium salt is selected form the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, chloroborane lithium, lower aliphatic carboxylic acid lithium, lithium tetraphenyl borate, imides, and mixtures thereof.

11. The lithium secondary battery according to claim 1, wherein the non-aqueous-based solvent is selected form the group consisting of a carbonate-based solvent, an ester-based solvent, an ether-based solvent, a ketone-based solvent, an alcohol-based solvent, an aprotic solvent, and a mixture thereof.

12. The lithium secondary battery according to claim 11, wherein the non-aqueous-based solvent is a mixture of linear carbonate and cyclic carbonate.

13. The lithium secondary battery according to claim 1, wherein the LTO is represented by Formula 3 below:

$$Li_xTi_yO_4 \qquad (3)$$

wherein 0.5<x<3 and 1<y<2.5.

14. A battery module comprising the lithium secondary battery according to claim 1 as a unit battery.

15. A battery pack comprising the battery module according to claim 14.

16. A device comprising the battery pack according to claim 15.

17. The device according to claim 16, wherein the device is an electric vehicle, a hybrid electric vehicle, a plug-in hybrid electric vehicle, or a system for storing power.

* * * * *